Figure 1:
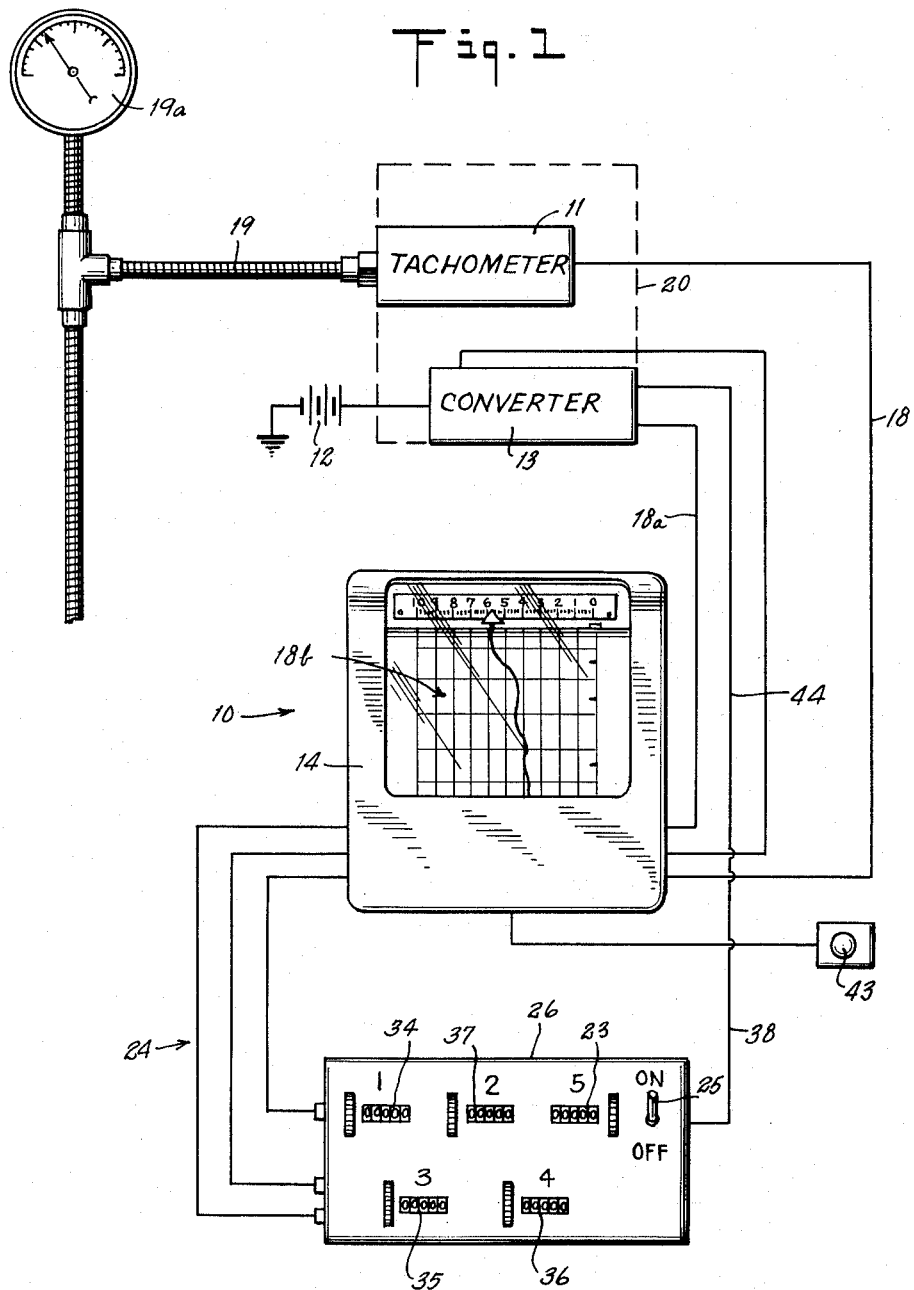

May 5, 1964     J. GREISSMAN     3,132,243
SIMULTANEOUS GRAPHIC RECORDING, COUNTING AND TIMING DEVICE
Filed April 20, 1962     3 Sheets-Sheet 1

INVENTOR.
JACOB GREISSMAN
BY William Wolfe
ATTORNEY

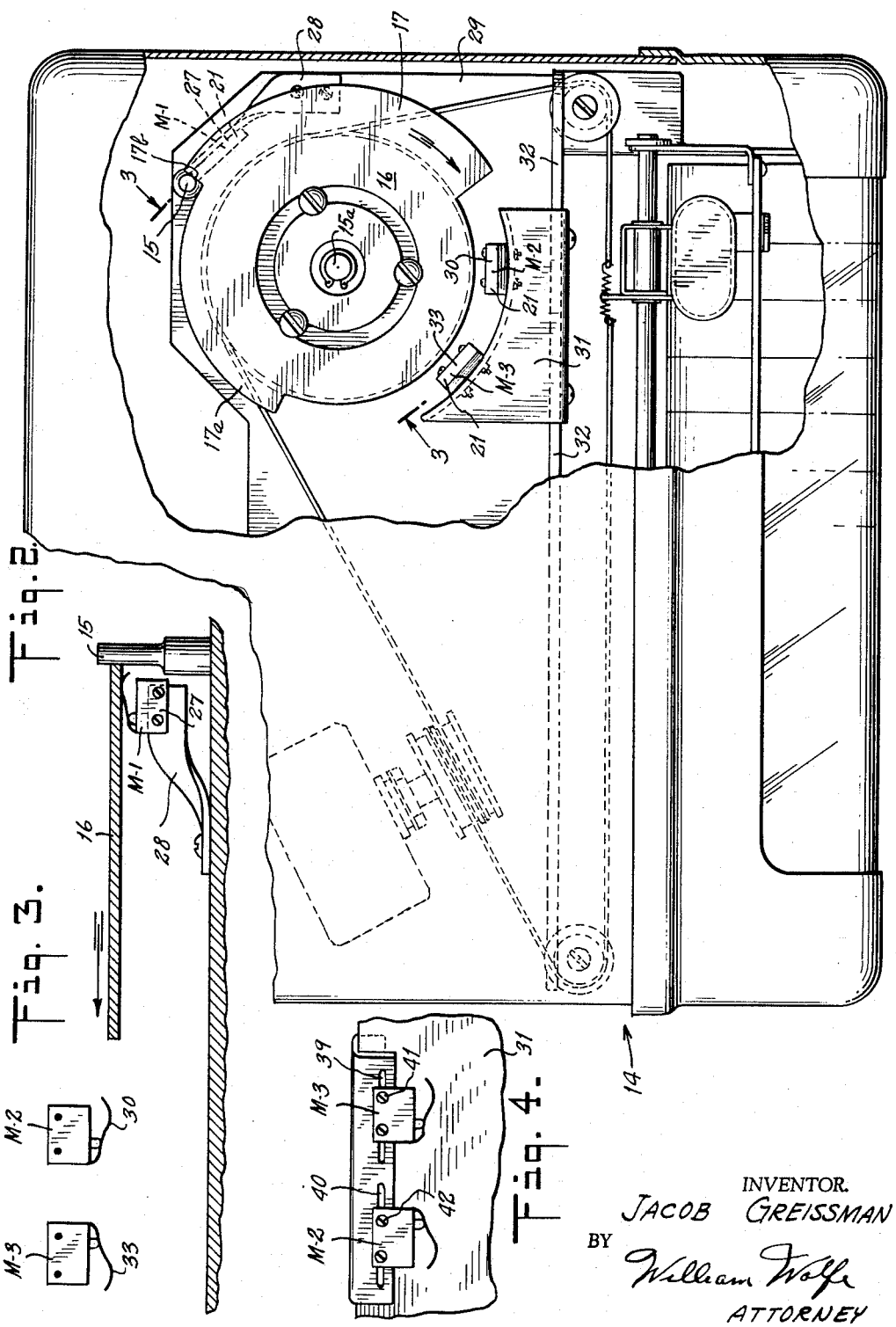

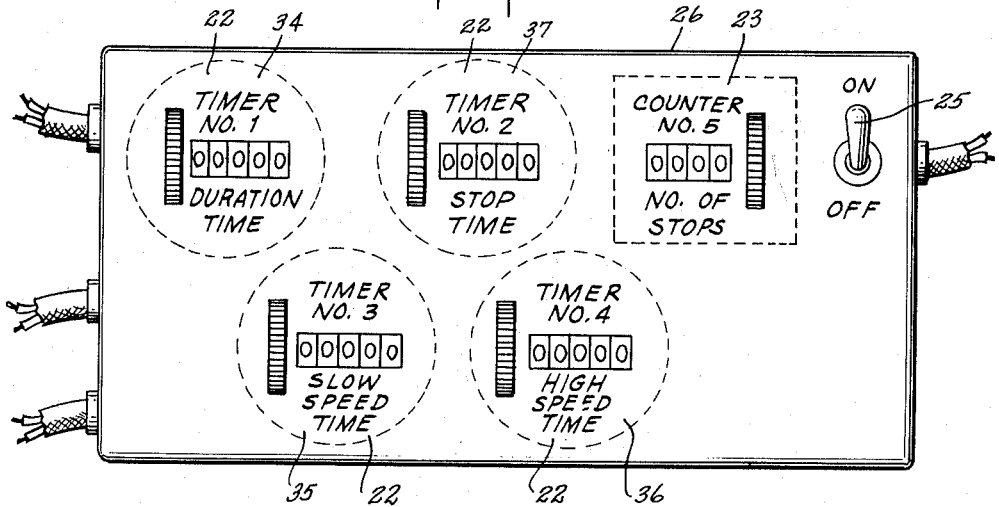
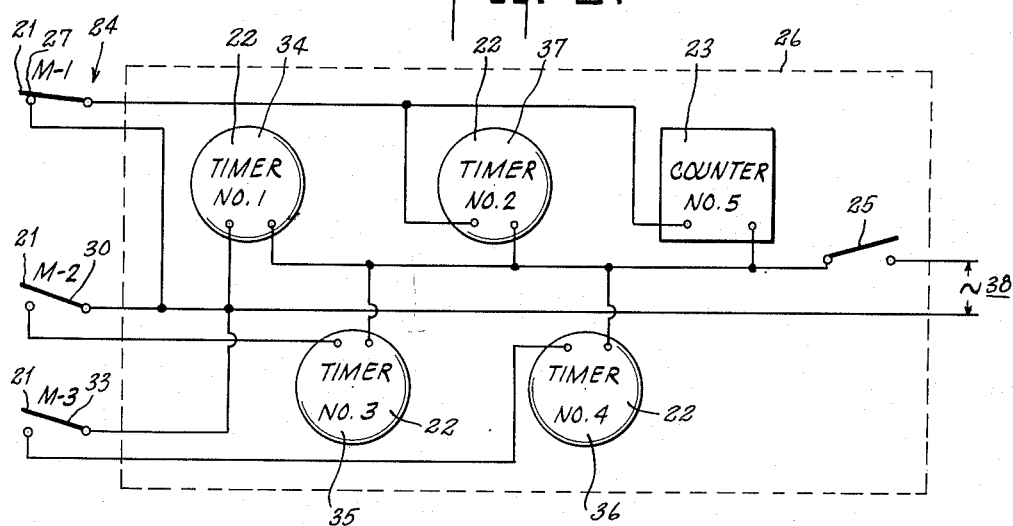

United States Patent Office 3,132,243
Patented May 5, 1964

3,132,243
SIMULTANEOUS GRAPHIC RECORDING, COUNTING AND TIMING DEVICE
Jacob Greissman, 1339 E. 13th St., Brooklyn 30, N.Y.
Filed Apr. 20, 1962, Ser. No. 188,996
1 Claim. (Cl. 235—92)

My invention relates in general to computers and recorders and more specifically to data compilers.

To establish traffic regulations which will permit the best use of a highway system it is necessary to know, in each street in the system, among other information: (1) the total time taken to ride from one point to another, (2) the number of times the car is stopped in the ride, (3) the total length of the stopped time, (4) the length of time the car travels under ten miles per hour, (5) the length of time the car travels between ten and thirty miles per hour, and (6) the length of time the car travels over thirty miles per hour. Sometimes, it is also advantageous to know other speed information characteristic of the travel pattern such as time of travel at forty, fifty or sixty miles per hour.

There are in use, at present, instruments which will produce, upon being attached to a car making a test run over a course, a complete graphic record of stops and speeds. However, it should be observed that such a graphic record is not suited for analysis to determine and base a traffic system upon because of the tremendous volume of interpretive work required. To determine the true characteristics of travel of cars on one street alone would require many test runs at different hours in a day as well as runs on different days. Thus, in an average city with hundreds of streets and in large cities with thousands of streets it would be necessary to analyze thousands of graphs. The reading and tabulating of the information on the graphs is a long and tedious task and lends itself to errors and inaccuracies. Thus a data compiler, which would automatically total separately each of the elements of information desired or provide them by simple subtraction, would void the requirement of interpreting and studying the graphs of the potentiometer as far as these elements are concerned.

Therefore it is an object of this invention to make a data compiling device which will compile information required in the study and analysis of a traffic pattern.

It should be realized also that the same type of device could be adapted to or used with any moving or movable element or machine or machine part to compile its time and motion record. Such a device could be attached to any rotary element of a production machine to compile a record of (1) total time, (2) time idle, (3) number of stops, (4) and (5) speeds of operation. A further object is to devise a lightweight, simple device which can be attached to a standard recording potentiometer to compile data, without interfering with the normal function of the potentiometer.

I accomplish these and other objects by providing in a standard potentiometer (Varian recorder) a plurality of switches operable by a two stage cam, a battery of timers and a counter, and one of the switches being connected electrically to a timer and the counter, and the other said switches being connected electrically, each to a said timer, a standard tachometer supplying voltage to operate the graph pen of the potentiometer, a direct current source of supply and a converter, said converter being connected to the power source and changing the current from direct to alternating and said converter being further electrically connected to operate the potentiometer graph motor, and also to supply current to the said timers and counters, whereby when the tachometer is motivated and its current source functions, the potentiometer is activated and its two stage cam's reciprocating motion causes the switches to function and allow currents to operate the timers and counter.

For further comprehension of the invention and of the objects and advantages thereof, reference will be had to the following description, the accompanying drawings and the appended claim in which various novel features of the invention are more particularly set forth.

In the accompanying drawings forming a material part of this disclosure:

FIG. 1 is a plan view of my invention as assembled with its tachometer, direct current source, a converter therefor, and a graph producing potentiometer having an event marker, FIG. 2 is a plan view partially cut away of part of the potentiometer shown in FIG. 1 and showing the switches of the invention and their positioning inside the potentiometer, a two stage cam of the invention replacing the usual stop plate of the potentiometer, and also showing the cord operating the recording pen, FIG. 3 is a detail along the line 3—3 of FIG. 2, FIG. 4 is a detail showing two of the switches attached to a bracket, FIG. 5 is a plan view of a box holding a plurality of timers, a counter and a manual throw switch, and FIG. 6 is a wiring diagram of the invention showing the electrical connection of the switches, timers, counter and throw switch.

In the drawing and in the specifications in which like numerals indicate similar elements, my invention 10, is shown with its component parts which are a tachometer 11, a direct current power source 12, which can be the storage battery of a car, a converter 13 and an altered recorder 14, which before the alteration was in the present instance a G-11A Varian potentiometer (Varian Associates). This type of potentiometer can be easily altered to suit the purposes of the invention. One of the changes in the potentiometer is to install on its motor shaft 15a a two stage cam 16 (see FIG. 2). The stop 15 is left in position and functions normally. As can be seen the two stage cam 16 is provided with a wide flange 17 and a narrow flange 17a. The potentiometer is operated by the voltage generated by the tachometer passing through the wiring 18 to a motor (not shown) in the potentiometer. There is also provided in the potentiometer a control device (not shown) which regulates (depending upon the increasing or decreasing of the voltage from the tachometer) the direction and amount of rotation of the motor. The motor through its shaft 15a causes the two stage cam to reciprocate. Thus the direction and amount of travel of the cam is dependent upon and in accordance with the voltage from the tachometer which is directly operated by the test vehicle. Secured on the shaft 15a is a drum (not shown) which operates the cord controlling the potentiometer pen. A synchronous motor (not shown) driven by the electric current in line 18a, from the converter, drives the tape 18b. The stop 15 has been so positioned by the maker of the potentiometer and the cam with its wide flange 17 by the inventor that when the tachometer supplies no voltage (test vehicle stopped) the motor causes the side edge 17b of the wide flange 17 of the cam to abut the stop 15, and when the voltage increases in the motor the cam rotates clockwise and when it decreases the cam rotates counter clockwise toward a zero position with the flange edge 17b abutting the stop.

It should be noted here that the test vehicle could be either a car or a production machine or other device.

In the present instance the tachometer is shown secured to and operated by a speedometer cable 19. There is also shown a speedometer dial 19a. The tachometer 11 and the converter 13 are shown housed in a container 20.

Also shown and used are simple contact switches 21, a plurality of standard reset timers 22, and a reset counter 23, and a novel wiring system 24.

The invention 10 is comprised of the installation of the two stage cam 16, the cam's relationship to the stop 15 and to the switches 21, the use, insertion and location of the switches in the potentiometer 14, the assembling and grouping of the timers 22 and counter 23, and the designing of the wiring system 24 whereby there is amassed and totaled the desired data. For convenience the timers 22, counter 23 and the throw switch 25 positioned adjacent one another in a box 26, the timers and counter are each capable of being reset back to zero.

In the present instance the object is to produce a traffic record by a test run of a car on a given street. The information, to establish the traffic pattern, requires a knowledge of six elements heretofore stated.

It should be recognized that, and it will be subsequently shown that, if desired, the switches 21 can be set or reset at other locations in the potentiometer to record other speeds than the ten and thirty miles heretofore stated. It should also be recognized that the tachometer could be attached to other machines as well as automobiles and so the device could be used to produce many types of records.

To provide the information for the automobile test run, the three micro-switches 21 are positioned in the potentiometer to function with the flanges of the cam. One, 27, of these switches, is so positioned on a bracket 28 secured to the chassis 29 of the potentiometer adjacent the stop 15 and directly under the rear of the wide flange 17 that it is in a closed or conducting state only while the cam is at rest against the stop. That is, the end of the wide flange 17 is pressing against the switch arm, and as soon as the car moves the cam turns clockwise and the flange 17 disengages itself from the switch and the switch automatically opens.

The second switch 30 is so positioned on a bracket 31 secured to the front 32 of the chassis that it will come in contact with the forward or leading edge of the narrow flange 17a of the cam and close when the cam has rotated the amount equivalent to a speed of ten miles an hour as defined by the voltage from the tachometer.

The third switch 33 is so positioned on the bracket 31 that it will come in contact with the forward or leading edge of the narrow flange 17a of the cam and close when the cam has rotated the amount equivalent to a speed of thirty miles an hour as defined by the tachometer. The arcuate length of the narrow flange 17a is so great that when the maximum speed is attained and the cam has rotated to its maximum position with the forward edge of the cam abutting the left side of the stop 15 the switches 30 and 33 are both closed and operating their timers, thus indicating speeds over thirty miles per hour.

Three of the four timers 22 and the counter 23 are electrically connected to the switches to record the information obtained by them. Switch 27, which is closed only at zero speed, is electrically connected to timer 37 and the counter 23, and thus a cumulative record of the stopped time is obtained on this timer and the total number of times stopped on the counter.

Switch 30, which closes at ten miles per hour, is electrically connected to timer 35, and switch 33, which closes at thirty miles per hour, is electrically connected to timer 36. Timer 34 however is not connected to any of the switches functioning on the cam but is connected directly to master throw switch 25 and so records the total operating time of the test run.

Electric current, provided by the power source 12, and converted by the converter 13, is transmitted by wire 38 to the master throw switch 25. From the master switch 25 separate circuits are established with (a) switch 27 and timer 37 to record stopped time, (b) switch 27 and counter 23 to record number of stops, (c) switch 30 and timer 35 to cumulatively record time traveled over ten miles per hour, and (d) switch 33 and timer 36 to cumulatively record time traveled over thirty miles per hour.

The device is installed in a car for a test run by appropriately securing the tachometer 11 to the car's speedometer cable or other suitable element and the converter 13 to a direct current source. The throw switch 25 is then closed, care being taken to make sure all the dials on the timers and counter are set at zero, and the car then makes the test run. The resultant information obtained is (a) total time taken to complete test run, (b) the number of times the car stopped in the ride, (c) the total length of stopped time, (d) the length of time the car travels under ten miles per hour, (e) the length of time the car travels between ten and thirty miles per hour, and (f) the length of time the car travels over thirty miles per hour.

It should be noted that some of the desired elements of information can be read directly and some must be obtained by subtraction. For the total elapsed time read timer 34, for the stopped time read timer 37 and for the number of stops read counter 23. The time traveled under ten miles per hour is obtained by subtracting from the total time (timer 34) the sum of the time traveled over ten miles per hour (timer 35) and the time stopped (timer 37). Time traveled between thirty and ten miles per hour is the difference between timers 36 and 35 and for the time traveled over thirty miles per hour read timer 36.

It should be noted that the switches 30 and 33 could be set to function at other speeds than ten and thirty miles per hour by placing them at other locations in relation to the cam 16 and its flanges 17 and 17a. Also, to do this the bracket 31 is provided with slots 39 and 40 through which bolts 41 and 42 extend to retain the switches 30 and 33 in movable position. It should be further noted that any number timers can be added together with appropriate switches set at desired locations to function with the flange 17 and 17a to take off travel time at various speeds.

In addition, it should be noted that although the potentiometer shown and used here is a G–11A Varian potentiometer, any other recording potentiometer could be used if it had a stop similar to stop 15 and a rotatable element similar to the motor shaft 15a of a standard potentiometer.

The potentiometer shown in FIG. 1 is provided with an event marker 43 which can be manually operated to indicate the location of intersecting streets on the graph which the potentiometer normally produces. It is powered by the converter through electric line 44.

Although I have shown my data compiler to be used with a recording potentiometer and for compiling data pertaining to traffic patterns, it should be understood that the tachometer could be attached to any rotating part of a machine and a speed and stop record of the machine be obtained. Thus it would become a simple matter to record the economic value of a production machine. Also, while I have illustrated and described the preferred embodiment of my invention, it is understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

In connection with a potentiometer affixed to a vehicle for producing a graphic record of time and speed of travel, an adaptation for producing numerical records of duration time of trip, time of no travel, number of stops, time of slow speed travel and time of high speed travel, comprised of a circular cam having a first arcuate flange and a second flange, said cam being positioned on and operated by the motor shaft of the potentiometer, a first contact switch, a second contact switch and a third contact switch, each of said switches being secured to the potentiometer frame adjacent said cam, said first flange having an arcuate dimension suitable to operate said first switch only when said vehicle is stopped and said second switch when the vehicle is travelling at a slow speed, and said first and second flanges together having arcuate dimensions suitable to operate both said second and third switches when the vehicle is traveling at a high speed, a duration of trip timer, a stopped trip timer, a slow speed timer, a high speed timer, a counter of stops, a source of electric current and a master switch, said duration of trip timer being electrically connected to the source of power and the master switch, and said first switch forming an electric circuit with the stopped trip timer, source of power and master switch, and said first switch also forming a second circuit with the counter of stops, source of power and master switch, and said second switch forming an electric circuit with the slow speed timer, source of power and master switch, and said third switch forming an electric circuit with the high speed timer, source of power and master switch whereby the duration of trip timer reads the total elapsed time of the trip, the stopped trip timer reads the length of time which the vehicle was not moving during the trip, the counter of stops records the number of stops on the trip, the slow speed timer record less the high speed timer record defines the time the vehicle was travelling at a slow speed and the high speed timer directly reads the time of high speed travel.

References Cited in the file of this patent

UNITED STATES PATENTS

| | | |
|---|---|---|
| 1,121,234 | Dodge | Dec. 15, 1914 |
| 1,594,584 | Wofford | Aug. 3, 1926 |
| 1,713,276 | Goekler | May 14, 1929 |
| 2,207,715 | Bumstead | July 16, 1940 |
| 2,368,761 | Hogan | Feb. 6, 1945 |
| 2,469,655 | Leathers | May 10, 1949 |
| 2,531,448 | Lingenfelder | Nov. 28, 1950 |
| 2,543,877 | Stein | Mar. 6, 1951 |
| 2,823,285 | Stone | Feb. 11, 1958 |
| 2,828,179 | Poncelet | Mar. 25, 1958 |
| 2,920,154 | Allen | Jan. 5, 1960 |
| 2,951,737 | Austin | Sept. 6, 1960 |
| 2,975,016 | Amsler | Mar. 14, 1961 |
| 3,013,854 | Vogtlin et al. | Dec. 19, 1961 |